Nov. 29, 1949     A. BECHLER     2,489,444
CAM DEVICE IN MACHINE TOOLS
Filed May 28, 1945
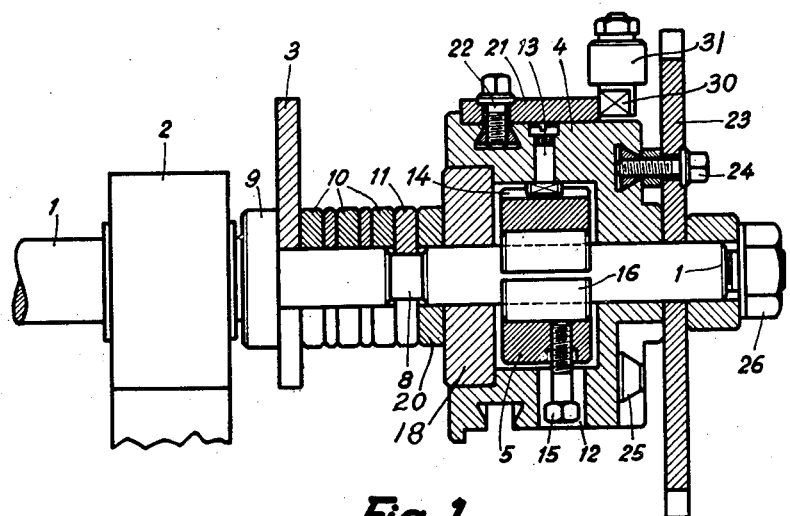
Fig. 1.
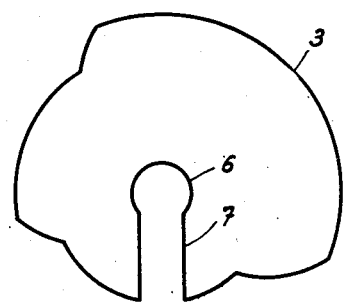
Fig. 2.
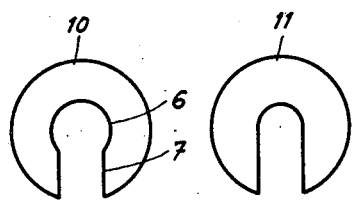
Fig. 3.     Fig. 4.
Inventor
A. Bechler Patented Nov. 29, 1949

2,489,444

UNITED STATES PATENT OFFICE 2,489,444

CAM DEVICE IN MACHINE TOOLS

André Bechler, Moutier, Switzerland

Application May 28, 1945, Serial No. 596,337
In Switzerland October 25, 1944

4 Claims. (Cl. 74—567)

In automatic lathes there is often at the cam shaft end a cam disc and a cam drum comprising grooves of different shapes and positions in which adjustable cams are held, co-operating with levers or feelers of the machine. The cam disc is fixed by the intermediary of the cam drum so that for changing the former, the contour of which depends on the kind of piece to be manufactured, it has hitherto been necessary to give the cam drum an axial displacement in order to make it possible to remove the cam disc after having removed the rings set along the shaft between cam disc and cam drum. The withdrawal of the cam drum required repositioning and readjusting of the same after every exchange of the cam disc.

The invention relates to a cam device for automatic lathes of the type described above, which is characterised in that the cam drum is made in two parts, the one integral with the cam shaft, and the other capable of an axial movement and driven only in rotation by the former. Such an arrangement permits to bring the different parts after every exchange of the cam disc again in correct mutual position without special readjusting work, in that the fixed part determines the exact situation of the whole set on the camshaft.

The accompanying drawings show as an example an execution form of a cam device according to the invention:

Fig. 1 is a section through the cam shaft axis;

Fig. 2 is a plan view of the cam disc, and

Fig. 3 and Fig. 4 are analogous views of intermediate rings.

The cam shaft of the automatic lathe partially shown is denoted by 1. It turns in the bearing 2.

The cam disc 3 and the cam drum 4/5 are fixed removably and overhanging to the camshaft 1. The former which is seen particularly in Fig. 2 has a bore-hole 6 of a diameter equal to that of the cam shaft 1, and a notch 7 the width of which is equal to the diameter of a cut 8 of the shaft 1. It follows from this disposition that in order to take out the cam disc 3, it is necessary to displace it axially within reach of the cut 8 where it may be removed from the shaft by radial displacement.

The cam disc is pressed against a shoulder 9 of the shaft 1 through a series of rings 10 which are seen from the side in Fig. 3, and which have exactly the same bore-hole and the same notch 7 as the cam disc 3. A ring 11 rides on the cut 8, the bore-hole of which is equal to the diameter of the cut 8, and is radially extended by a cut-out of the same width.

The cam drum comprises two parts: a first, 4, movable axially on the shaft 1 but concerning the rotating motion it is made integral with the second fixed part 5 by means of studs 13 the tails of which penetrate into grooves 14 of the fixed part whereas their screw heads lie in recesses of the movable part 4. The fixed part 5 of the cam drum is made integral with the shaft 1 by means of a screw 15 abutting on a split sleeve 16 surrounding the cam shaft. The screw 15 goes with play through a bore-hole 12 of the part 4. This play is large enough to allow the movable part 4 of the cam drum of being displaced in axial direction after having loosened the nut 26.

On the movable part of the cam drum some cams 21 are fixed which are of known construction, the said cams being fixed to the movable part 4 by means of bolts 22. Feelers 30 mounted on levers 31 cooperate with cam 21. On the right of the cam drum a cam disc 23 is provided exactly adjusted on the cam shaft 1, and is driven by means of studs 24, whose ends penetrate into grooves 25 of dovetailed cross section cut into the movable part 4.

A nut 26 screwed to the end of the camshaft 1 holds together the whole set consisting of cam 3, rings 10, 11 and 20, plate 18, the movable part 4, and the cam disc 23, this set abutting on the shoulder 9 of the cam shaft. If it is desired to exchange the cam disc 3 it suffices to loosen the nut 26 slightly in order to first release the ring 11 by a small axial displacement of the movable part 4 of the cam drum. Ring 11 having been removed, it is possible to move the rings 10, one after another, and the cam disc 3 within reach of the cut 8, when they can be removed by radial displacement. A new cam disc 3 having been inserted, the above-mentioned manipulation is carried out in the inverse sense. The new cam disc is now again held by means of the movable part 4.

The displacement undergone by the movable part 4 will not derange the exact position of the cams 21 relatively to the feelers 30 with which they co-operate; furthermore the width of the rings 10 and 11 being constant, and the position of the fixed part 5 having not been changed in any way, the exchange of the cam disc 3 will not entail any supplementary adjusting work.

What I claim is:

1. In a machine-tool, a camshaft, a cam disc detachably mounted on said camshaft, a drum carrying cams, comprising a first part rigidly fixed to said camshaft, a second part, a nut arranged to press upon said second part in order to fix said cam disc rigidly to said camshaft, means connecting said first with said second part in a manner to take the latter along on rotation but to allow this second part an axial displacement with regard to said first part on said nut being released so as to allow said cam disc of being removed radially from said camshaft, said camshaft having a shoulder, and a thinned part between said cam disc and said second part, rings detachably mounted on said camshaft between said second part and said cam disc to transmit the pressure of said nut to said cam disc to press it against said shoulder, said rings and said cam disc having radially arranged cut-outs allowing them, after said nut having been released and after their having been brought within reach of said thinned part, to be removed radially from said camshaft.

2. In a machine-tool, a camshaft, a cam disc detachably mounted on said camshaft, a drum carrying cams, comprising a first part rigidly fixed to said camshaft, a second part, a nut arranged to press upon said second part in order to fix said cam disc rigidly to said camshaft, means connecting said first with said second part in a manner to take the latter along on rotation but to allow this second part an axial displacement with regard to said first part on said nut being released so as to allow said cam disc of being removed radially from said camshaft, one of said parts of said drum having a groove parallel to said camshaft, said means being fixed to the other of said parts and entering said groove with allowance for sliding, said camshaft having a shoulder, and a thinned part between said cam disc and said second part, rings detachably mounted on said camshaft between said second part and said cam disc to transmit the pressure of said nut to said cam disc to press it against said shoulder, said rings and said cam disc having radially arranged cut-outs allowing them, after said nut having been released and after their having been brought within reach of said thinned part, to be removed radially from said camshaft.

3. In a machine-tool, a camshaft, a cam disc detachably mounted on said camshaft, a drum carrying cams, comprising a first part rigidly fixed to said camshaft, a second part, a nut arranged to press upon said second part in order to fix said cam disc rigidly to said camshaft, means connecting said first with said second part in a manner to take the latter along on rotation but to allow this second part an axial displacement with regard to said first part on said nut being released so as to allow said cam disc of being removed radially from said camshaft, said camshaft having a shoulder, and a thinned part between said cam disc and said second part, rings detachably mounted on said camshaft between said second part and said cam disc to transmit the pressure of said nut to said cam disc to press it against said shoulder, said rings and said cam disc having radially arranged cut-outs allowing them, after said nut having been released and after their having brought within reach of said thinned part, to be removed radially from said camshaft, a split sleeve between said first part and said camshaft, said second part comprising a hole, a bolt fixed to said first part to press upon said split sleeve to fix said first part rigidly on said camshaft, said bolt entering with play into said hole in order to allow the axial displacement of said second part with regard to said first part.

4. In a machine tool, a camshaft, a cam disc detachably mounted on said camshaft, a drum carrying cams, comprising a first part rigidly fixed to said camshaft, a second part, a nut arranged to press upon said second part in order to fix said cam disc rigidly to said camshaft, means connecting said first with said second part in a manner to take the latter along on rotation but to allow this second part an axial displacement with regard to said first part on said nut being released so as to allow said cam disc of being removed radially from said camshaft, one of said parts of said drum having a groove parallel to said camshaft, said means being fixed to the other of said parts and entering said groove with allowance for sliding, said camshaft having a shoulder, and a thinned part between said cam disc and said second part, rings detachably mounted on said camshaft between said second part and said cam disc to transmit the pressure of said nut to said cam disc to press it against said shoulder, said rings and said cam disc having radially arranged cut-outs allowing them, after said nut having been released and after their having been brought within reach of said thinned part, to be removed radially from said camshaft, a split sleeve between said first part and said camshaft, said second part comprising a hole, a bolt fixed to said first part to press upon said split sleeve to fix said first part rigidly on said camshaft, said bolt entering with play into said hole in order to allow the axial displacement of said second part with regard to said first part.

ANDRÉ BECHLER.

REFERENCES CITED

The following references are of record in the file of this patent:

UNITED STATES PATENTS

| Number | Name | Date |
| --- | --- | --- |
| 1,745,932 | Jacques | Feb. 4, 1930 |
| 1,793,279 | Fischer et al. | Feb. 17, 1931 |
| 2,308,963 | Davis et al. | Jan. 19, 1943 |
| 2,376,572 | Durdick | May 22, 1945 |
| 2,377,239 | Kasen | May 29, 1945 |
| 2,379,545 | Silva et al. | July 3, 1945 |